United States Patent
Hamaguchi

(10) Patent No.: US 9,281,910 B2
(45) Date of Patent: Mar. 8, 2016

(54) RADIO BROADCAST RECEIVING APPARATUS AND BROADCAST FREQUENCY DETECTION METHOD

(71) Applicant: Alpine Electronics, Inc., Tokyo (JP)

(72) Inventor: Tomoya Hamaguchi, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 14/643,312

(22) Filed: Mar. 10, 2015

(65) Prior Publication Data

US 2015/0288470 A1 Oct. 8, 2015

(30) Foreign Application Priority Data

Apr. 4, 2014 (JP) ................. 2014-077598

(51) Int. Cl.

| H04B 17/00 | (2015.01) |
|---|---|
| H04H 40/27 | (2008.01) |
| H04B 17/318 | (2015.01) |
| H04B 1/16 | (2006.01) |
| H04H 20/71 | (2008.01) |
| H04H 60/43 | (2008.01) |

(52) U.S. Cl.
CPC .............. *H04H 40/27* (2013.01); *H04B 1/16* (2013.01); *H04B 17/318* (2015.01); *H04H 20/71* (2013.01); *H04H 60/43* (2013.01)

(58) Field of Classification Search
CPC ....... H04H 60/43; H04H 20/57; H04H 20/71; H04H 60/25; H04B 17/318
USPC ................ 455/423, 67.11, 67.16, 226.1, 134, 455/161.3, 226.2
See application file for complete search history.

(56) References Cited

U.S. PATENT DOCUMENTS

| 7,929,931 B2 * | 4/2011 | Nakamura ............. H04H 60/64 348/568 |
|---|---|---|
| 8,280,397 B2 * | 10/2012 | Shimahara ........... H04B 1/3805 455/414.1 |
| 2010/0289756 A1 * | 11/2010 | Anzures ................ G06F 3/0346 345/173 |

FOREIGN PATENT DOCUMENTS

| JP | 2005/101273 | 5/2005 |
|---|---|---|
| JP | 2006-340004 | 12/2006 |

OTHER PUBLICATIONS

European Search Report for corresponding EP Application No. 15156253.5, dated Aug. 10, 2015, 7 pages.

* cited by examiner

*Primary Examiner* — Sonny Trinh
(74) *Attorney, Agent, or Firm* — Brinks Gilson & Lione

(57) ABSTRACT

In a radio broadcast receiving apparatus and a broadcast frequency detection method, a frequency fm at which a reception strength (an S meter value) that is equal to or greater than a threshold value Th0 and is greater than reception strengths at frequencies (fm−1) and (fm+1) adjacent to the frequency fm by one step by X or more, is detected as a broadcast reception frequency that is a frequency at which a receivable broadcast is performed. The value of X is set so that it increases with the increase in the reception strength (S meter value) at the frequency fm. As a result, a frequency at which a broadcast is performed can be more accurately detected.

6 Claims, 5 Drawing Sheets

RADIO BROADCAST RECEIVING APPARATUS AND BROADCAST FREQUENCY DETECTION METHOD

RELATED APPLICATIONS

The present application claims priority to Japanese Patent Application Serial Number 2014-077598, filed Apr. 4, 2014, the entirety of which is hereby incorporated by reference.

BACKGROUND OF THE INVENTION

1. Field of the Invention

The present invention relates to a technique for a radio broadcast receiving apparatus to detect a frequency at which a receivable broadcast is performed.

2. Description of the Related Art

As a technique for allowing a radio broadcast receiving apparatus to detect a frequency at which a receivable broadcast is performed, a technique is known in which the radio broadcast receiving apparatus searches for a frequency at which a value of reception strength (S meter value) is greater than a predetermined threshold value and is greater than a value of reception strength at a frequency adjacent to the frequency by one step. During the search, the radio broadcast receiving apparatus changes the frequency in predetermined steps and determines a retrieved frequency as a frequency at which a receivable broadcast is performed (see, for example, Japanese Unexamined Patent Application Publication No. 2006-340004).

SUMMARY OF THE INVENTION

When a broadcast receiving apparatus utilizes the above-described technique for searching for a frequency at which a broadcast is performed, a frequency at which a broadcast is not actually performed may be incorrectly retrieved as a frequency at which a broadcast is performed in a frequency band in which a noise level is higher than the threshold value. Accordingly, the accuracy of the search technique is low.

It is an object of the present invention to more accurately detect a frequency at which a broadcast is performed.

According to an embodiment of the present invention, there is provided a radio broadcast receiving apparatus for receiving a radio broadcast performed with one of broadcastable frequencies arranged at predetermined frequency intervals in a predetermined frequency range. The radio broadcast receiving apparatus includes a receiving section, a demodulation section, a reception strength detection section, and a reception control section.

The receiving section is configured to detect a broadcast signal of one of the broadcastable frequencies set as a reception target frequency and output the broadcast signal as a received signal. The demodulation section is configured to demodulate the received signal to an audio signal and output the audio signal. The reception strength detection section is configured to detect a strength of the received signal as a reception strength value at the broadcastable frequency set as the reception target frequency in the receiving section.

The reception control section includes a broadcast frequency detection unit configured to detect a frequency at which a receivable broadcast is performed as a broadcast frequency. The broadcast frequency detected by the broadcast frequency detection unit is one of the broadcastable frequencies at which the reception strength value is greater than a predetermined threshold value, is equal to or greater than a criterion value determined in accordance with the reception strength value at the broadcastable frequency, and is greater than both the reception strength values at two of the broadcastable frequencies which are adjacent to the broadcastable frequency in an increasing frequency direction and a decreasing frequency direction. The criterion value increases with an increase in the reception strength value.

In the radio broadcast receiving apparatus, the reception control section may further include a search control unit configured to cause the broadcast frequency detection unit to detect the broadcast frequency while sequentially changing in the increasing frequency direction or the decreasing frequency direction of the broadcastable frequencies, one of which is set as the reception target frequency in the receiving section, to stop sequentially changing the broadcastable frequencies when the broadcast frequency is detected, and to perform control processing so that a next reception target frequency becomes the detected broadcast frequency in the receiving section.

In the radio broadcast receiving apparatus, the reception control section may further include a scan control unit and a preset frequency reception control unit. The scan control unit may cause the broadcast frequency detection unit to detect the broadcast frequency while sequentially changing in the increasing frequency direction or the decreasing frequency direction in the predetermined frequency range of the broadcastable frequencies, one of which is set as the reception target frequency in the receiving section, and to store as present frequencies each of the broadcastable frequencies which has been detected as the broadcast frequency. The preset frequency reception control unit may set one of the stored preset frequencies selected by a user as the reception target frequency in the receiving section.

According to the radio broadcast receiving apparatus, by taking advantage of the fact that the difference between reception strengths at a broadcast frequency and a broadcastable frequency adjacent to the broadcast frequency increases with the increase in the reception strength at the broadcast frequency, and that such a relationship is not present between broadcastable frequencies other than the broadcast frequency which are adjacent to each other, a criterion value, which is used to determine whether a broadcastable frequency is the broadcast frequency and is a condition used for the difference between reception strengths at broadcastable frequencies adjacent to each other, is set so that it increases with the increase in the reception strength at the broadcast frequency. As a result, only a broadcast frequency can be accurately detected.

According to an embodiment of the present invention, it is possible to more accurately detect a frequency at which a broadcast is performed.

DETAILED DESCRIPTION OF THE DRAWINGS

Figure 1:
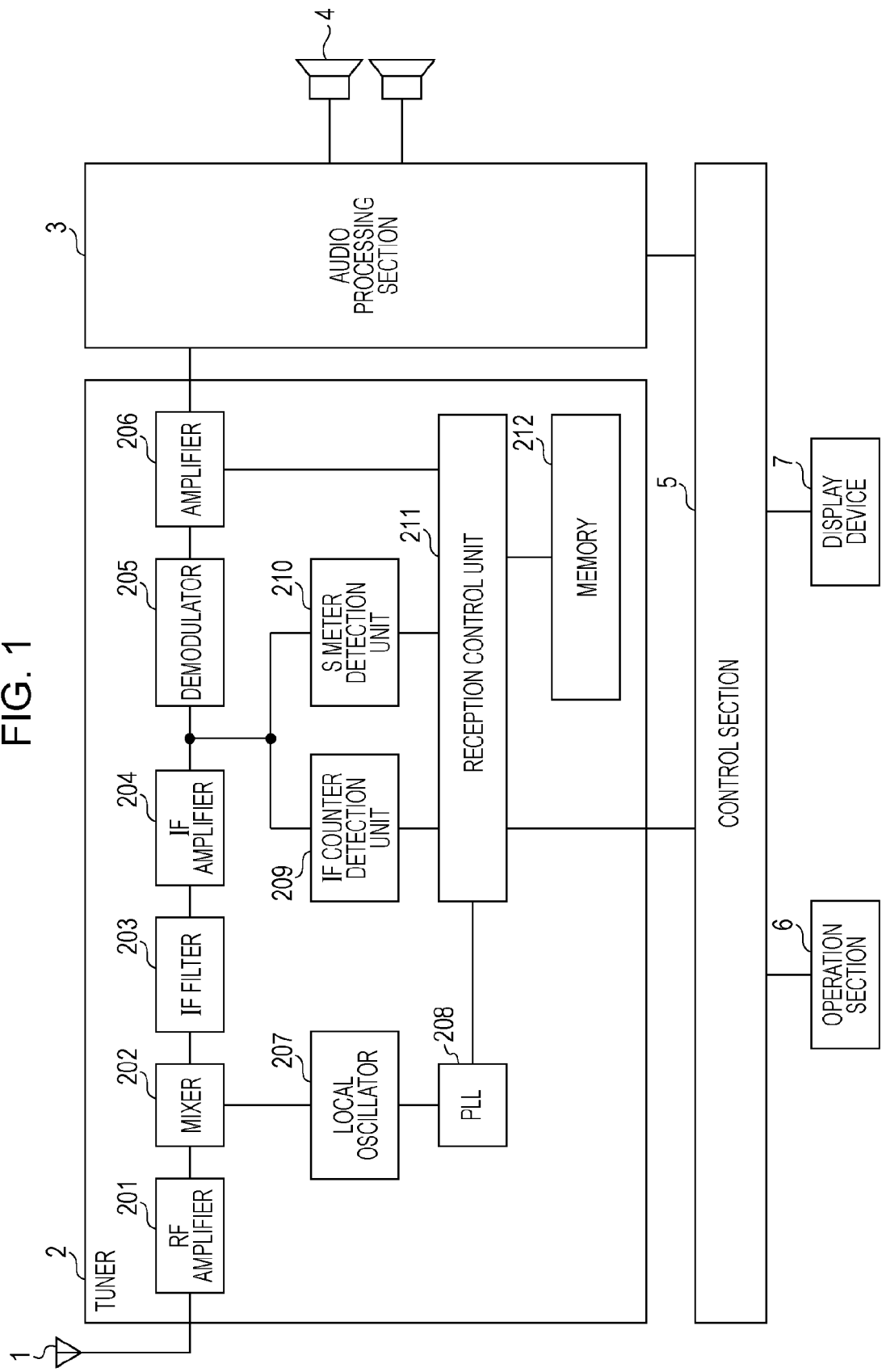
FIG. 1 is a block diagram illustrating one configuration of a radio broadcast receiving apparatus.

One implementation of a radio broadcast receiving apparatus will be described below. A configuration of a radio broadcast receiving apparatus is illustrated in FIG. 1. As illustrated in FIG. 1, a radio broadcast receiving apparatus includes an antenna 1, a tuner 2, an audio processing section 3, a speaker 4, a control section 5, an operation section 6, and a display device 7. The tuner 2 includes an RF amplifier 201, a mixer 202, an IF filter 203, an IF amplifier 204, a demodulator 205, an amplifier 206, a local oscillator 207, a PLL 208, an IF counter detection unit 209, an S meter detection unit 210, a reception control unit 211, and a memory 212.

With this configuration, the antenna 1 receives a broadcast signal. In the tuner 2, the RF amplifier 201 amplifies a signal output from the antenna 1. The mixer 202 mixes a signal output from the RF amplifier 201 and a local oscillation signal generated by the oscillator 207, so that the signal output from the antenna 1 is converted into an IF signal. The IF filter 203 selectively passes a signal component of a predetermined frequency in the IF signal output from the mixer 202. The IF amplifier 204 amplifies the IF signal that has passed through the IF filter 203. The demodulator 205 performs AM detection upon the IF signal amplified by the IF amplifier 204, thereby demodulating the IF signal to an audio signal. The amplifier 206 amplifies the audio signal output from the demodulator 205 and outputs the amplified audio signal to the audio processing section 3.

A reception frequency to be received by the tuner 2 is determined in accordance with the oscillation frequency of a local oscillation signal generated by the local oscillator 207. The reception control unit 211 controls the division ratio of the PLL 208 and sets the oscillation frequency of a local oscillation signal, thereby controlling the reception frequency of the tuner 2.

The S meter detection unit 210 detects the strength of the IF signal amplified by the IF amplifier 204 and outputs a result of the detection to the reception control unit 211 as an S meter value. An S meter value detected by the S meter detection unit 210 indicates the reception strength of a broadcast signal of a current reception frequency. The IF counter detection unit 209 detects the frequency of the IF signal amplified by the IF amplifier 204 and outputs a result of the detection to the reception control unit 211.

The audio processing section 3 performs pieces of audio processing such as amplification and the change of a frequency characteristic on the received audio signal and outputs the processed audio signal to the speaker 4. The control section 5 provides user interfaces corresponding to the operation section 6 and the display device 7 and controls the reception frequency of the tuner 2 and the audio processing operation of the audio processing section 3 in accordance with a user's operation performed via the user interfaces.

A broadcast frequency search process performed by the reception control unit 211 in the tuner 2 will be described below. The broadcast frequency search process is started by the control section 5 in response to a user's search operation performed via the operation section 6. The user's search operation includes an up-search operation and a down-search operation. When the broadcast frequency search process is started in response to the up-search operation, an increasing frequency direction is set as a search direction. When the broadcast frequency search process is started the in response to the down-search operation, a decreasing frequency direction is set as the search direction.

Figure 2:
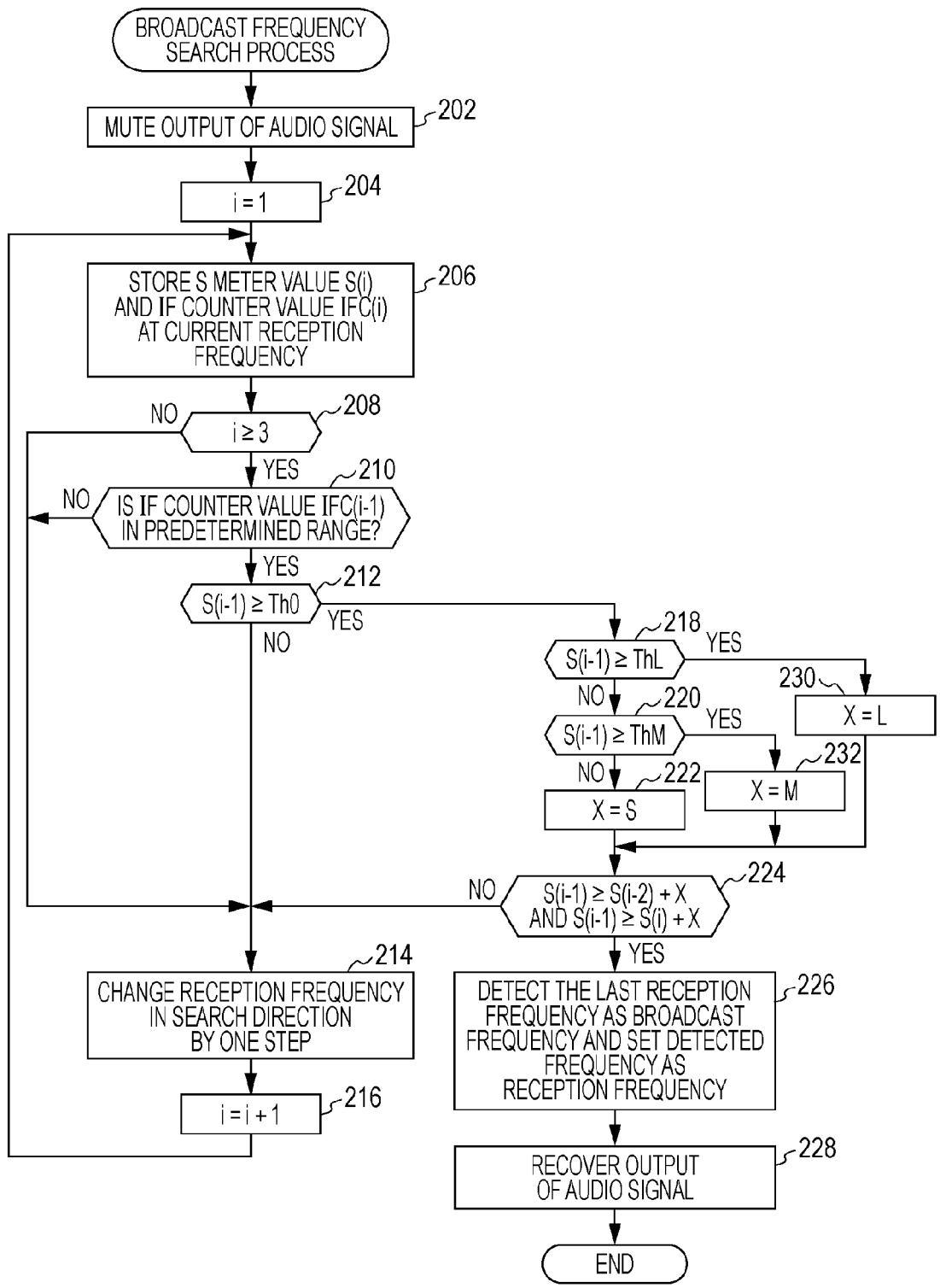
FIG. 2 is a flowchart illustrating one implementation of a broadcast frequency search process.

FIG. 2 illustrates a broadcast frequency search process performed by the reception control unit 211 in the tuner 2. As illustrated in the drawing, in the broadcast frequency search process, the reception control unit 211 controls the amplifier 206 so as to mute (stop) the output of an audio signal to the audio processing section 3 (step 202). Subsequently, the equation of i=1 is set (step 204). An S meter value (reception strength value) detected by the S meter detection unit 210 at a current reception frequency is stored as S(i), and an IF counter value (frequency) detected by the IF counter detection unit 209 at the current reception frequency is stored as IFC(i) (step 206).

Subsequently, it is determined whether i is equal to or greater than 3 (step 208). When i is not equal to or greater than 3, a reception frequency to be received by the tuner 2 is changed from the current reception frequency in the search direction by one step (step 214). The one step is a spacing between frequencies that can be used as broadcast frequencies, and is set to 9 kHz in AM broadcasting in Japan and is set to 9 or 10 kHz in AM broadcasting in foreign countries. In order to prevent a mutual interference, both of the frequencies that are adjacent to each other by one step in the same area are not generally set as broadcast frequencies.

When the 1 step is 9 kHz and the search direction is in the increasing frequency direction, the change of a reception frequency in the search direction by one step means that the reception frequency is increased by 9 kHz. When the 1 step is 9 kHz and the search direction is in the decreasing frequency direction, the change of a reception frequency in the search direction by one step means that the reception frequency is decreased by 9 kHz.

Subsequently, i increments by one (step 216) and the process returns to step 206. On the other hand, when i is equal to or greater than 3 (step 208), it is determined whether an IF counter value IFC(i−1) stored for the last reception frequency (a reception frequency from which a current reception frequency has been changed in the search direction by one step) is in a predetermined frequency range (step 210). When the IF counter value IFC(i−1) is not in the predetermined frequency range, the reception frequency of the tuner 2 is changed in the search direction by one step from the current reception frequency (step 214) and i increments by one (step 216). The process returns to step 206.

On the other hand, when the IF counter value IFC(i−1) stored for the last reception frequency is in the predetermined frequency range (step 210), an S meter value S(i−1) stored for the last reception frequency is equal to or greater than a predetermined threshold value Th0 (step 212). When the S meter value S(i−1) is not equal to or greater than the predetermined threshold value Th0, the reception frequency of the tuner 2 is changed in the search direction by one step from the current reception frequency (step 214) and i increments by one (step 216). The process returns to step 206.

On the other hand, when the S meter value S(i−1) stored for the last reception frequency is equal to or greater than the predetermined threshold value Th0 (step 212), the value of X is set as follows under the assumption that ThL, ThM, L, M, and S are determined so that ThL>ThM and L>M>S are satisfied. When the S meter value S(i−1) is equal to or greater than ThL (step 218), X=L is set (step 230). When the S meter value S(i−1) is less than ThL and is equal to or greater than ThM (steps 218 and 220), X=M is set (step 232). The S meter value S(i−1) is less than ThM (steps 218 and 220), X=S is set (step 222).

It is determined whether the S meter value S(i−1) at the last reception frequency is greater than an S meter value S(i−2) at the second last reception frequency by X or more and is greater than the S meter value S(i) at the current reception frequency by X or more (step 224).

When the S meter value S(i−1) at the last reception frequency is not greater than the S meter value S(i−2) at the second last reception frequency by X or more or is not greater than the S meter value S(i) at the current reception frequency by X or more (step 224), the reception frequency of the tuner 2 is changed from the current reception frequency in the search direction by one step (step 214) and i increments by one (step 216). The process returns to step 206.

On the other hand, when the S meter value S(i−1) at the last reception frequency is greater than the S meter value S(i−2) at the second last reception frequency by X or more and is greater than the S meter value S(i) at the current reception frequency by X or more (step 224), the last reception frequency (a frequency at which the S meter value S(i−1) has been detected) is detected as a broadcast frequency at which a receivable broadcast is performed and the last reception frequency is set as the reception frequency of the tuner 2 (step 226).

The reception control unit 211 controls the amplifier 206 so as to recover the output of an audio signal to the audio processing section 3 (step 228). The broadcast frequency search process ends. According to the above-described broadcast frequency search process performed by the reception control unit 211 in the tuner 2, a frequency fm at which the reception strength (the S meter value) is equal to or greater than the threshold value Th0 and that is greater than both reception strengths at frequencies (fm−1) and (fm+1) adjacent to the frequency fm by one step by X or more is detected as a broadcast reception frequency that is a frequency at which a receivable broadcast is performed.

The value of X increases with the increase in the reception strength (S meter value) at the frequency fm. As a result, in a frequency band in which a noise level is higher than the threshold value Th0, a frequency at which no broadcast is performed is not incorrectly detected as a frequency at which a broadcast is performed.

Exemplary broadcast frequency detection in the broadcast frequency search process performed by the reception control unit 211 in the tuner 2 will be described below. Descriptions will be made under the assumption that 1 step=9 kHz, the threshold value Th0=34 dBµV, THL=55 dBµV, ThM=45 dBµV, L=15 dBµV, M=10 dBµV, and S=5 dBµV. In this case, when the S meter value is equal to or greater than 55 dBµV, X=L=15 dBµV is set. When the S meter value is equal to or greater than 45 dBµV and is less than 55 dBµV, X=M=10 dBµV is set. When the S meter value is less than 45 dBµV, X=S=5 dBµV is set.

Figure 3A:
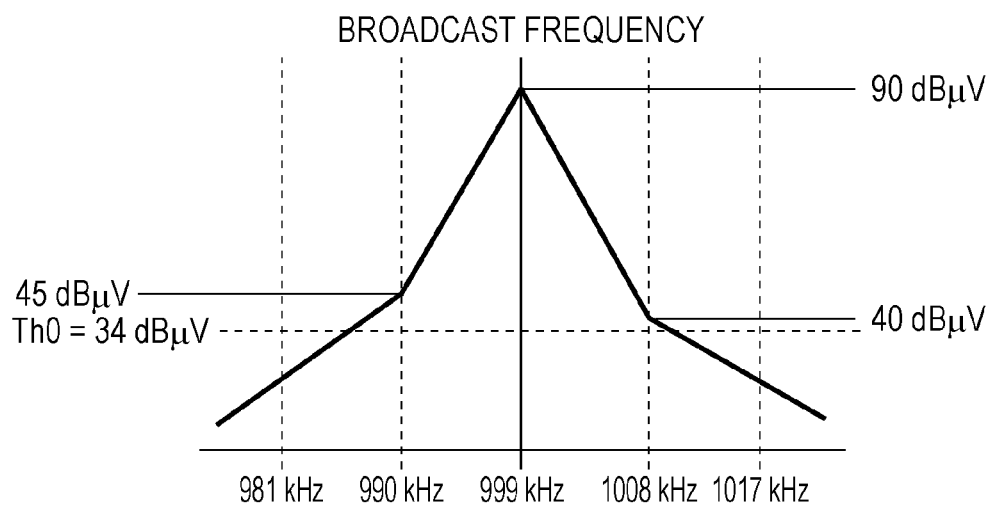
FIGS. 3A and 3B are diagrams illustrating pieces of exemplary processing in a broadcast frequency search process.

FIG. 3A is a diagram illustrating an exemplary reception strength (S meter value) measured in a frequency range of 981 kHz to 1017 kHz. In the drawing, the horizontal axis represents a frequency and the vertical axis represents a reception strength (S meter value).

In this exemplary case, a frequency at which a broadcast is actually performed is 999 kHz. At 990 kHz, 999 kHz, and 1008 kHz, S meter values exceed the threshold value Th0=34 dBµV. However, 990 kHz and 1008 kHz are not detected as broadcast frequencies since the S meter value at 999 kHz that is adjacent to these frequencies by one step is greater than the S meter values at these frequencies.

The value of X set for the S meter value of 90 dBµV at 999 kHz is L=15 dBµV. Since the S meter value of 90 dBµV at 999 kHz is greater than both the S meter value of 45 dBµV at an adjacent frequency of 990 kHz and the S meter value of 40 dBµV at an adjacent frequency of 1008 kHz by X=15 dBµV or more, 999 kHz is detected as a broadcast frequency.

Figure 3B:
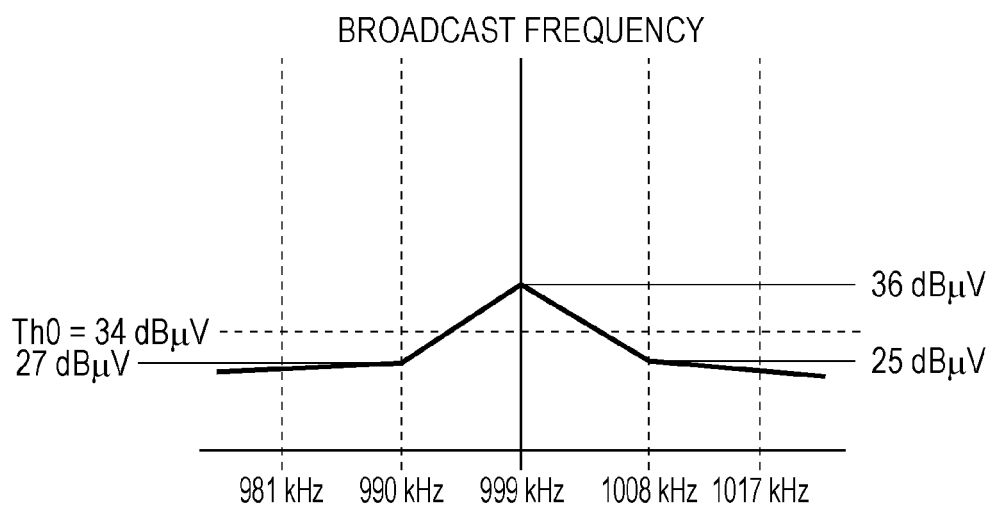

FIG. 3B illustrates an exemplary case in which a reception strength at a broadcast frequency is small, and, like FIG. 3A, illustrates reception strengths (S meter values) measured in the frequency range of 981 kHz to 1017 kHz. Referring to FIG. 3B, a frequency at which a broadcast is actually performed is also 999 kHz.

In this exemplary case, only at 999 kHz, an S meter value exceeds the threshold value of Th0=34 dBµV. Accordingly, 990 kHz and 1008 kHz are not detected as broadcast frequencies. The value of X set for the S meter value of 36 dBµV at 999 kHz is S=5 dBµV. Since the S meter value of 36 dBµV at 999 kHz is greater than both the S meter value of 27 dBµV at an adjacent frequency of 990 kHz and the S meter value of 25 dBµV at an adjacent frequency of 1008 kHz by X=5 dBµV or more, 999 kHz is detected as a broadcast frequency.

It is assumed that, like in the exemplary case illustrated in FIG. 3A, in the exemplary case illustrated in FIG. 3B, X=15 dBµV is used for 999 kHz. Since the S meter value of 36 dBµV at 999 kHz is not greater than both the S meter value of 27 dBµV at the adjacent frequency of 990 kHz and the S meter value of 25 dBµV at the adjacent frequency of 1008 kHz by X=15 dBµV or more, 999 kHz at which a broadcast is actually performed is not detected as a broadcast frequency. When X=10 dBµV is used, the S meter value of 36 dBµV at 999 kHz is not similarly greater than the S meter value of 27 dBµV at the adjacent frequency of 990 kHz by X=10 dBµV or more. Accordingly, 999 kHz at which a broadcast is actually performed is not detected as a broadcast frequency.

Figure 4:
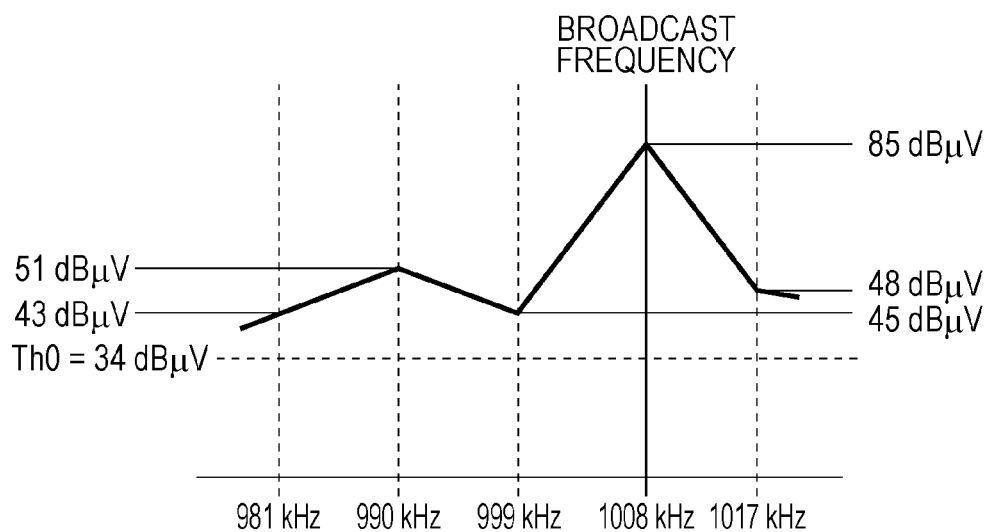
FIG. 4 is a diagram illustrating exemplary processing in a broadcast frequency search process.

FIG. 4 illustrates an exemplary case in which a noise level is high with some cause in a frequency range around a broadcast frequency, and illustrates reception strengths (S meter values) measured in the frequency range of 981 kHz to 1017 kHz. Referring to FIG. 4, a frequency at which a broadcast is actually performed is 1008 kHz.

In this exemplary case, at 981 kHz, 990 kHz, 999 kHz, 1008 kHz, and 1017 kHz, S meter values exceed the threshold value of Th0=34 dBµV. However, 981 kHz, 999 kHz, and 1017 kHz are not detected as broadcast frequencies since S meter values at frequencies adjacent to these frequencies by one step are greater than S meter values at these frequencies.

The value of X set for the S meter value of 51 dBµV at 990 kHz is M=10 dBµV. Since the S meter value of 51 dBµV at 990 kHz is not greater than both the S meter value of 43 dBµV at an adjacent frequency of 981 kHz and the S meter value of 45 dBµV at an adjacent frequency of 999 kHz by X=10 dBµV or more, 990 kHz is not detected as a broadcast frequency.

It is assumed that, like in the exemplary case illustrated in FIG. 3B, in this exemplary case, X=5 dBµV is used for 990 kHz. The S meter value of 51 dBµV at 990 kHz is greater than both the S meter value of 43 dBµV at the adjacent frequency of 981 kHz and the S meter value of 45 dBµV at the adjacent frequency of 999 kHz by X=5 dBµV or more. Accordingly, 990 kHz is incorrectly detected as a broadcast frequency.

The value of X set for the S meter value of 85 dBµV at 1008 kHz at which a broadcast is actually performed is L=15 dBµV. Since the S meter value of 85 dBµV at 1008 kHz is greater than both the S meter value of 45 dBµV at the adjacent frequency of 999 kHz and the S meter value of 48 dBµV at the adjacent frequency of 1017 kHz by X=15 dBµV or more, 1008 kHz is detected as a broadcast frequency.

As described previously, in a broadcast frequency search process according to an embodiment of the present invention, by taking advantage of the fact that the difference between reception strengths at a broadcast frequency and a frequency adjacent to the broadcast frequency by one step increases with the increase in the reception strength at the broadcast frequency and the fact that such a relationship is not present between frequencies other than the broadcast frequency which are adjacent to each other by one step, the difference X between reception strengths at frequencies adjacent to each other by one step, which is a condition used to determine whether a frequency is the broadcast frequency, is set so that it increases with the increase in the reception strength at the broadcast frequency. As a result, only a broadcast frequency can be accurately detected. As described previously, both of the frequencies that are adjacent to each other by one step in the same area are not generally set as broadcast frequencies.

According to an embodiment of the present invention, a frequency at which a receivable broadcast is performed can be accurately detected. Next, a broadcast frequency scan process performed by the reception control unit 211 in the tuner 2 will be described. In the broadcast frequency scan process performed by the reception control unit 211 in the tuner 2, all of frequencies at which receivable broadcasts are performed are searched for, are associated with preset numbers as preset frequencies, and are stored in the memory 212.

When one of preset numbers associated with preset frequencies in memory 212 is selected via the operation section 6, the control section 5 causes the reception control unit 211 to set a preset frequency associated with the selected preset number as the reception frequency of the tuner 2.

Figure 5:
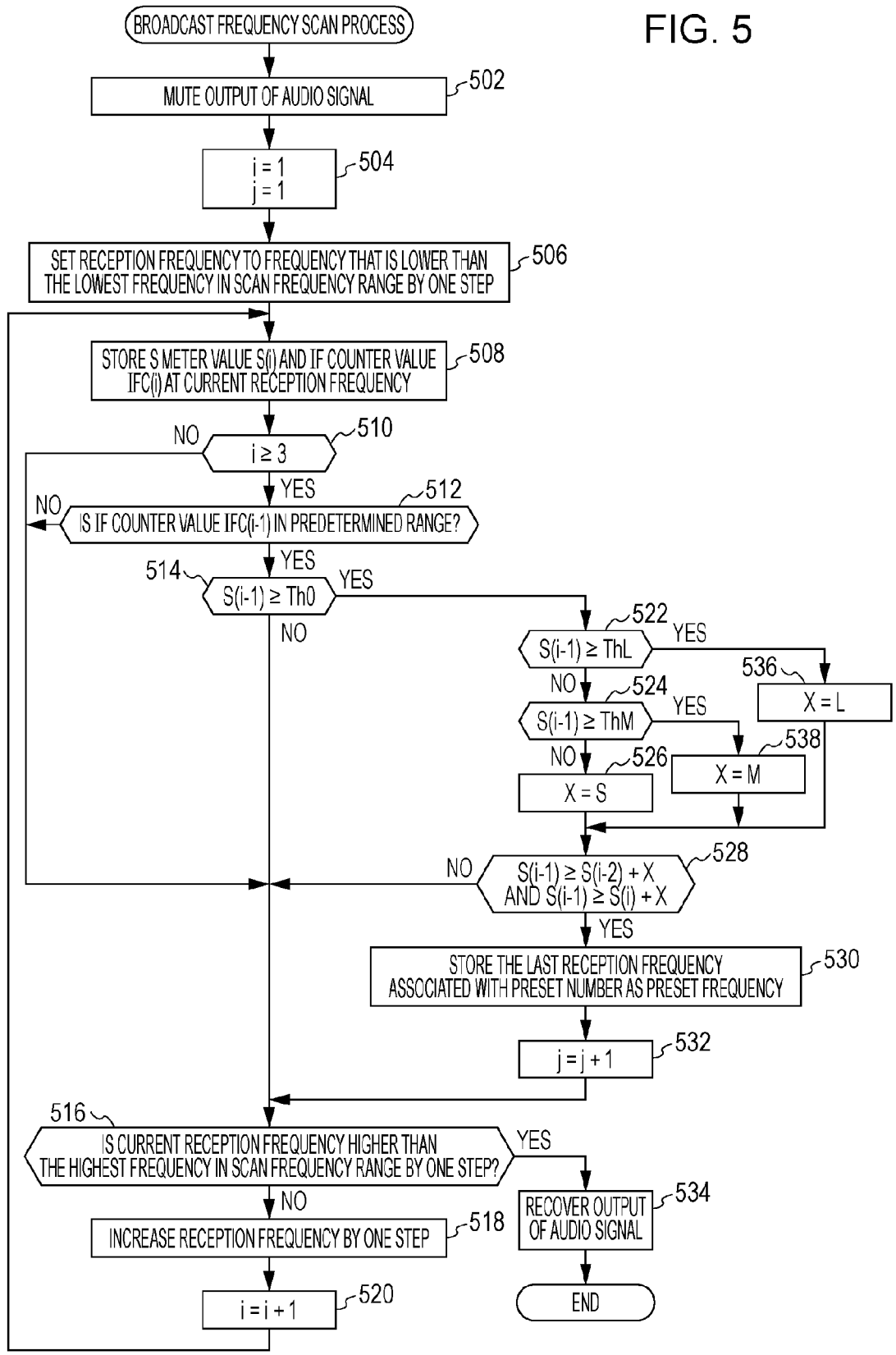
FIG. 5 is a flowchart illustrating one implementation of a frequency scan process.

FIG. 5 illustrates the broadcast frequency scan process performed by the reception control unit 211 in the tuner 2. As illustrated in the drawing, in this process, the reception control unit 211 controls the amplifier 206 so as to mute (stop) the output of an audio signal to the audio processing section 3 (step 502). Subsequently, the equations of i=1 and j=1 are set (step 504). The reception frequency of the tuner 2 is set to a frequency that is lower than the lowest frequency in a scan frequency range (a frequency range between the highest frequency and the lowest frequency at which a receivable broadcast is probably performed: a frequency range of 531 kHz to 1602 kHz in the case of AM broadcasting in Japan) by one step (step 506).

An S meter value (a reception strength value) detected by the S meter detection unit 210 at a current reception frequency is stored as S(i), and an IF counter value (frequency) detected by the IF counter detection unit 209 at the current reception frequency is stored as IFC(i) (step 508).

Subsequently, it is determined whether i is equal to or greater than 3 (step 510). When i is not equal to or greater than 3, the process proceeds to step 516. On the other hand, when i is equal to or greater than 3 (step 510), it is determined whether an IF counter value IFC(i−1) stored for the last reception frequency (a reception frequency from which a current reception frequency has been increased by one step) is in a predetermined frequency range (step 512). When the IF counter value IFC(i−1) is not in the predetermined frequency range, the process proceeds to step 516.

On the other hand, when the IF counter value IFC(i−1) stored for the last reception frequency is in the predetermined frequency range (step 512), it is determined whether an S meter value S(i−1) stored for the last reception frequency is equal to or greater than a predetermined threshold value Th0 (step 514). When the S meter value S(i−1) is not equal to or greater than the predetermined threshold value Th0, the process proceeds to step 516.

On the other hand, when the S meter value S(i−1) stored for the last reception frequency is equal to or greater than the predetermined threshold value Th0 (step 514), the process proceeds to step 522. When the S meter value S(i−1) is equal to or greater than ThL (step 522), X=L is set (step 536). When the S meter value S(i−1) is less than ThL and is equal to or greater than ThM (steps 522 and 524), X=M is set (step 538). When the S meter value S(i−1) is less than ThM (step 524), X=S is set (step 526).

It is determined whether the S meter value S(i−1) at the last reception frequency is greater than an S meter value S(i−2) at the second last reception frequency by X or more and is greater than the S meter value S(i) at the current reception frequency by X or more (step 528).

When the S meter value S(i−1) at the last reception frequency is not greater than the S meter value S(i−2) at the second last reception frequency by X or more or is not greater than the S meter value S(i) at the current reception frequency by X or more (step 528), the process proceeds to step 516.

On the other hand, the S meter value S(i−1) at the last reception frequency is greater than the S meter value S(i−2) at the second last reception frequency by X or more and is greater than the S meter value S(i) at the current reception frequency by X or more (step 528), the last reception frequency (a frequency at which the S meter value S(i−1) has been detected) is detected as a preset frequency, is associated with a preset number j, and is stored in the memory 212 (step 530). Subsequently, j increments by one (step 532). The process proceeds to step 516.

It is determined whether the current reception frequency is equal to a frequency to which the highest frequency in the scan frequency range has been increased by one step (step 516). When the current reception frequency is not equal to the frequency, the reception frequency of the tuner 2 is increased from the current reception frequency by one step (step 518) and i increments by one (step 520). The process returns to step 508.

On the other hand, when the current reception frequency is equal to the frequency to which the highest frequency in the scan frequency range has been increased by one step (step 516), the reception control unit 211 controls the amplifier 206 so as to recover the output of an audio signal to the audio processing section 3 (step 532). The broadcast frequency scan process ends.

The broadcast frequency scan process performed by the reception control unit 211 in the tuner 2 has been be described. By performing this broadcast frequency scan process, like in the case of the broadcast frequency search process, a frequency at which a receivable broadcast is performed can be accurately detected and be stored as a preset frequency.

It is intended that the foregoing detailed description be regarded as illustrative rather than limiting, and that it be understood that it is the following claims, including all equivalents, that are intended to define the spirit and scope of this invention.

What is claimed is:

1. A radio broadcast receiving apparatus for receiving a radio broadcast performed with one of broadcastable frequencies arranged at predetermined frequency intervals in a predetermined frequency range, the radio broadcast receiving apparatus comprising:
   a receiving section configured to detect a broadcast signal of one of the broadcastable frequencies set as a reception target frequency and to output the broadcast signal as a received signal;
   a demodulation section configured to demodulate the received signal to an audio signal and to output the audio signal;
   a reception strength detection section configured to detect a strength of the received signal as a reception strength value at the broadcastable frequency set as the reception target frequency in the receiving section; and
   a reception control section including a broadcast frequency detection unit configured to detect a frequency at which a receivable broadcast is performed as a broadcast frequency, and
   wherein the broadcast frequency detected by the broadcast frequency detection unit is one of the broadcastable frequencies at which the reception strength value is greater than a predetermined threshold value, is equal to or greater than a criterion value determined in accordance with the reception strength value at the broadcastable frequency, and is greater than both the reception strength values at two of the broadcastable frequencies which are adjacent to the broadcastable frequency in an increasing frequency direction and a decreasing frequency direction, and wherein the criterion value increases with an increase in the reception strength value.

2. The radio broadcast receiving apparatus according to claim 1, wherein the reception control section further includes a search control unit configured to cause the broadcast frequency detection unit to detect the broadcast frequency while sequentially changing in the increasing frequency direction or the decreasing frequency direction of the broadcastable frequencies, one of which is set as the reception target frequency in the receiving section, to stop sequentially changing the broadcastable frequencies when the broadcast frequency is detected, and to perform control processing so that a next reception target frequency becomes the detected broadcast frequency in the receiving section.

3. The radio broadcast receiving apparatus according to claim 1, wherein the reception control section further includes a scan control unit and a preset frequency reception control unit, wherein the scan control unit is configured to cause the broadcast frequency detection unit to detect the broadcast frequency while sequentially changing in the increasing frequency direction or the decreasing frequency direction in the predetermined frequency range of the broadcastable frequencies, one of which is set as the reception target frequency in the receiving section, and to store as present frequencies each of the broadcastable frequencies which has been detected as the broadcast frequency, and wherein the preset frequency reception control unit is configured to set one of the stored preset frequencies selected by a user as the reception target frequency in the receiving section.

4. A broadcast frequency detection method of detecting a frequency at which a receivable broadcast is performed as a broadcast frequency in a radio broadcast receiving apparatus that receives a radio broadcast performed with one of broadcastable frequencies arranged at predetermined frequency intervals in a predetermined frequency range and includes a receiving section configured to detect a broadcast signal of one of the broadcastable frequencies set as a reception target frequency and output the broadcast signal as a received signal, a demodulation section configured to demodulate the received signal to an audio signal and output the audio signal, and a reception strength detection section configured to detect a strength of the received signal as a reception strength value at the broadcastable frequency set as the reception target frequency in the receiving section, the method comprising:

a broadcastable frequency detecting step of detecting one of the broadcastable frequencies at which the reception strength value is greater than a predetermined threshold value;

a criterion value setting step of setting a criterion value so that the criterion value increases with an increase in the reception strength value at the detected broadcastable frequency; and a broadcast frequency detecting step of detecting the detected one of the broadcastable frequencies as the broadcast frequency when the detected one of the broadcastable frequencies is equal to or greater than the set criterion value and is greater than both the reception strength values at two of the broadcastable frequencies which are adjacent to the broadcastable frequency in the increasing frequency direction and the decreasing frequency direction.

5. The broadcast frequency detection method according to claim 4, further comprising:

a searching step of performing the broadcast frequency detecting step while sequentially changing in the increasing frequency direction or the decreasing frequency direction the broadcastable frequencies one of which is set as the reception target frequency in the receiving section, detecting the broadcast frequency, stopping sequentially changing the broadcastable frequencies when the broadcast frequency is detected, and performing control processing so that a next reception target frequency set in the receiving section becomes the detected broadcast frequency, and wherein, in the broadcast frequency detecting step, the detected broadcast frequency is one of the broadcastable frequencies at which the reception strength value is greater than a predetermined threshold value, is equal to or greater than a criterion value that is determined in accordance with the reception strength value at the broadcastable frequency so that the criterion value increases with an increase in the reception strength value, and is greater than both the reception strength values at two of the broadcastable frequencies which are adjacent to the broadcastable frequency in the increasing frequency direction and the decreasing frequency direction.

6. The broadcast frequency detection method according to claim 4, further comprising:

a preset frequency storing step of performing the broadcast frequency detecting step while sequentially changing in the increasing frequency direction or the decreasing frequency direction over the predetermined frequency range of the broadcastable frequencies, one of which is set as the reception target frequency in the receiving section, detecting the broadcast frequency, and storing as present frequencies each of the broadcastable frequencies which has been detected as the broadcast frequency, and wherein, in the broadcast frequency detecting step, the detected broadcast frequency is one of the broadcastable frequencies at which the reception strength value is greater than a predetermined threshold value, is equal to or greater than a criterion value that is determined in accordance with the reception strength value at the broadcastable frequency so that the criterion value increases with an increase in the reception strength value, and is greater than both the reception strength values at two of the broadcastable frequencies which are adjacent to the broadcastable frequency in the increasing frequency direction and the decreasing frequency direction.

* * * * *